United States Patent
Serdarevic (10) Patent No.: US 9,209,694 B2
(45) Date of Patent: Dec. 8, 2015

(54) VOLTAGE TRANSFORMER AND METHOD FOR TRANSFORMING VOLTAGE

(75) Inventor: Emir Serdarevic, Graz (AT)

(73) Assignee: AMS AG, Unterpremstaetten (AT)

( * ) Notice: Subject to any disclaimer, the term of this patent is extended or adjusted under 35 U.S.C. 154(b) by 364 days.

(21) Appl. No.: 13/395,629

(22) PCT Filed: Sep. 9, 2010

(86) PCT No.: PCT/EP2010/063244
§ 371 (c)(1),
(2), (4) Date: May 29, 2012

(87) PCT Pub. No.: WO2011/029875
PCT Pub. Date: Mar. 17, 2011

(65) Prior Publication Data
US 2012/0229111 A1    Sep. 13, 2012

(30) Foreign Application Priority Data
Sep. 11, 2009 (DE) .......................... 10 2009 041 217

(51) Int. Cl.
G05F 1/10 (2006.01)
H02M 3/158 (2006.01)
H02M 1/00 (2007.01)

(52) U.S. Cl.
CPC .......... *H02M 3/1582* (2013.01); *H02M 3/1588* (2013.01); *H02M 2001/0045* (2013.01); *Y02B 70/1466* (2013.01)

(58) Field of Classification Search
None
See application file for complete search history.

(56) References Cited

U.S. PATENT DOCUMENTS

| 3,798,471 | A | * | 3/1974 | Williams et al. | 327/108 |
| 6,150,798 | A | | 11/2000 | Ferry et al. | |
| 6,232,752 | B1 | * | 5/2001 | Bissell | 323/225 |
| 7,084,611 | B2 | | 8/2006 | Kirchner et al. | |
| 7,560,910 | B2 | * | 7/2009 | Hata et al. | 323/222 |
| 7,692,416 | B2 | | 4/2010 | Shimizu | |
| 7,994,765 | B2 | | 8/2011 | Takada et al. | |
| 2003/0151423 | A1 | | 8/2003 | Ishii | |

(Continued)

FOREIGN PATENT DOCUMENTS

DE        102 49 802        5/2004

OTHER PUBLICATIONS

"AS1329 Low Voltage, Micropower, DC-DC Step-Up Converters", austriamicrosystems AG, Revision 1.06, pp. 1-19, 2009.

(Continued)

*Primary Examiner* — Nguyen Tran
*Assistant Examiner* — Monica Mata
(74) *Attorney, Agent, or Firm* — McDermott Will & Emery LLP (57) ABSTRACT

A voltage transformer (10) comprises an inductor (11), a first and a second switch (15, 16), and a control unit (25). A first terminal (12) of the inductor is supplied an input voltage (VIN). The first switch (15) is disposed between a second terminal (13) of the inductor (11) and a reference potential terminal (17). The second switch (16) is disposed between the second terminal (13) of the inductor (11) and an output (19) of the voltage transformer (10). The control unit (25) is configured to set the first switch (15) in a first and a second phase (A, B) of a first operating mode of the voltage transformer (10) into a blocking operating state and to set the second switch (15) in the first phase (A) into a conducting operating state and in the second phase (B) into an operating state having different conductivity.

15 Claims, 5 Drawing Sheets

(56) References Cited

U.S. PATENT DOCUMENTS

| | | |
|---|---|---|
| 2003/0178974 A1 | 9/2003 | Rozsypal |
| 2004/0008016 A1* | 1/2004 | Sutardja et al. ............... 323/283 |
| 2004/0027101 A1* | 2/2004 | Vinciarelli .................... 323/259 |
| 2004/0056642 A1* | 3/2004 | Nebrigic et al. ............... 323/284 |
| 2004/0135556 A1 | 7/2004 | Kirchner et al. |
| 2005/0001603 A1* | 1/2005 | May ............................... 323/284 |
| 2006/0176035 A1* | 8/2006 | Flatness et al. ............... 323/282 |
| 2006/0176036 A1* | 8/2006 | Flatness et al. ............... 323/282 |
| 2006/0176037 A1* | 8/2006 | Flatness et al. ............... 323/282 |
| 2007/0052395 A1* | 3/2007 | Belch ............................ 323/222 |
| 2007/0057658 A1 | 3/2007 | Hasegawa |
| 2007/0069703 A1 | 3/2007 | Kokubun et al. |
| 2007/0085519 A1* | 4/2007 | Xu ................................. 323/282 |
| 2008/0150366 A1* | 6/2008 | Adest et al. .................... 307/77 |
| 2008/0211467 A1 | 9/2008 | Huang et al. |
| 2008/0239774 A1 | 10/2008 | Canfield et al. |
| 2008/0303499 A1* | 12/2008 | Chen et al. .................... 323/282 |
| 2009/0009104 A1* | 1/2009 | Doi et al. ....................... 315/291 |
| 2009/0146623 A1* | 6/2009 | de Cremoux et al. ......... 323/271 |
| 2010/0194366 A1 | 8/2010 | Serdarevic |

OTHER PUBLICATIONS

"AS1331 300mA Buck-Boost Synchronous DC/DC Converters", austriamicrosystems AG, Revision 1.02, pp. 1-16, 2009.

"TPS61028—96% Efficient synchronous boost converter", Texas Instruments Inc., Datasheet, Revised Feb. 2006.

\* cited by examiner

VOLTAGE TRANSFORMER AND METHOD FOR TRANSFORMING VOLTAGE

RELATED APPLICATIONS

This application is a U.S. National Phase Application under 35 USC 371 of International Application PCT/EP2010/063244 filed Sep. 9, 2010.

This application claims the priority of German application no. 10 2009 041 217.4 filed Sep. 11,2009,the entire content of which is hereby incorporated by reference.

FIELD OF THE INVENTION

The invention relates to a voltage converter and a method for converting voltage.

BACKGROUND OF THE INVENTION

Voltage converters are frequently designed as either step-up converters or step-down converters. If a voltage converter is connected on the input side to a battery whose voltage diminishes over time, it can be necessary to carry out a step-down conversion with a voltage converter designed for step-up conversion.

The document US 2004/0135556 A1 describes a DC/DC converter with an inductor and two switches. A first switch connects an output-side terminal of the inductor to a reference potential terminal. A second switch additionally connects the output-side terminal of the inductor to one output of the voltage converter. For step-down conversion, the first switch is alternately switched from the conductive state to the blocking state.

The document US 2008/0211467 A1 concerns a circuit for reducing oscillations in switching converters and shows various converters. One period can have three phases with different operating states.

The data sheet "AS1329 Low Voltage, Micro power, DC-DC Step-Up Converters", austriamicrosystems AG, Austria, version 1.06, 2009 describes a step-up converter.

The document US 2003/0178974 A1 specifies a step-up/step-down voltage converter with an inductor and a first and second switch.

SUMMARY OF THE INVENTION

One object of the present invention is to provide a voltage converter and a method for voltage conversion that allows a high effectiveness of energy utilization.

In one embodiment, a voltage converter comprises an inductor, a first and a second switch as well as a control unit. The inductor has a first and a second terminal. The first switch couples the second terminal of the inductor to a reference potential terminal. The second switch couples the second terminal of the inductor to an output of the voltage converter. An input voltage is fed to the first terminal of the inductor. The control unit is configured to put the first switch, in a first operating mode of the voltage converter, into a blocking state in a first and a second phase. The control unit is further configured to put the second switch into a conductive state in the first phase and into an operating state with a different conductivity in the second phase.

The first switch is advantageously opened i.e., set to a blocking operating state, in the first operating mode of the voltage converter. This avoids a flow of current to the reference potential terminal. A current flow to the output of the voltage converter is therefore possible only through the inductor and the second switch. Thereby a high efficiency in the usage of energy is achieved.

In one embodiment, a semiconductor body and the inductor connected to the semiconductor body comprise the voltage converter. The voltage converter can be realized by means of the inductor and exactly one semiconductor body to which the inductor is connected.

In one embodiment, the voltage converter carries out a step-down conversion in the first operating mode. A value of the input voltage in this case is higher than a value of an output voltage that is present at the output of the voltage converter.

In one embodiment, the voltage converter is configured for step-up conversion in a second operating mode.

In one embodiment, a first current flows through the inductor and the second switch to the output. The efficiency of energy usage is increased because of the voltage drop at only one switch, namely the second switch.

In a refinement, the first and second switches have a high current carrying capacity. A high current advantageously flows only through the two switches. Therefore the voltage converter requires only a small surface area on the semiconductor body.

In one embodiment, the control unit is configured to adjust the second switch in the first operating mode in such a manner that it has a first value of an on-state resistance in the first phase and a second value of the on-state resistance, different from the first value, in the second phase. The second value can be higher than the first value.

The first value can be less than 1 Ohm. It can preferably be less than 100 mOhm. The first switch can be permanently in the blocking state in the first operating mode. The driving of the first switch in the first operating mode can be independent of the first and the second phase. The second switch can be permanently in a conductive state in the first operating mode. The second switch is driven and adjusted differently, depending on the phase of the first operating mode. The second switch has a first conductivity in the first phase that differs from a second conductivity during the second phase. The first conductivity is greater than the second conductivity.

In a refinement, the voltage converter has an inactive operating mode. The inactive operating mode can also be referred to as a non-active operating mode. In the inactive operating mode, the first and second switches are switched to block. Both switches can be permanently blocking during the inactive operating mode.

In one embodiment, the control unit is configured to adjust the second switch in such a manner that the first current increases in the first phase and decreases in the second phase. A flow of current from the first terminal of the inductor to the output of the voltage converter is enabled in the first and the second phase. The value of the output voltage can increase in the first phase. Due to the higher on-state resistance of the second switch during the second phase and the resulting decreasing value of the first current during the second phase, a value of the output voltage can be prevented from becoming too large over the first and second phases.

In one embodiment, the control unit has a clock input. The clock input is used to feed a clock signal to the control unit. The clock signal has a cycle time. The cycle time comprises a first duration of the first phase and a second duration of the second phase of the first operating mode. The cycle time can be the sum of the first and the second durations. The cycle time can be constant. The clock signal can have a constant frequency. The first phase and the second phase in the first operating mode alternate with one another and repeat periodically according to the clock signal. The voltage conversion is advantageously done at a fixed frequency. Therefore, other circuitry components can be configured so that they are not influenced by the frequency of the voltage converter.

In one embodiment, a period of the clock signal with the cycle time comprises several first phases and several second phases that alternate with one another. The sum of the durations of the first phases in one period is referred to as the first duration. Accordingly, the second duration is defined as the sum of the durations of the second phase during one period.

In a refinement, there does not exist during a cycle time in the first operating mode any additional phase in which the first and second switches have operating states that are different both from the operating states in the first phase and from the operating states in the second phase. In one embodiment, the first duration of the first phase in the first operating mode is adjusted as a function of the difference between the input voltage and the output voltage. In an alternative embodiment, the first duration of the first phase is adjusted as a function of the difference between the input voltage and a predetermined value of the output voltage. The larger the value of the difference, the smaller the value of the first duration that can be set. In case of a large difference, the second switch is advantageously closed only for brief periods, so that a current to the output is limited.

In one embodiment, the voltage converter comprises a first comparator. A first input of the first comparator is coupled to the input of the voltage converter. A comparison voltage is fed to a second input of the first comparator. An output of the first comparator is coupled to a first input of the control unit.

In one embodiment, the second input of the first comparator is coupled to the output of the voltage converter. Alternatively, the second input of the first comparator can be connected to a predetermined value voltage source. The predetermined value voltage source provides the predetermined value of the output voltage. The first comparator is therefore used to compare the input voltage to the output voltage or the predetermined value of the output voltage. The first or second operating mode of the voltage converter is adjusted as a function of the comparison result. The voltage converter can be operated with the first operating mode, for example, if the value of the input voltage is greater than the value of the output voltage.

In one embodiment, a threshold-value voltage source is arranged between the input of the voltage converter and the first input of the first comparator. The threshold-value voltage source can alternatively be arranged between the output of the voltage converter and the second input of the first comparator. A threshold value can be set by means of the threshold-value voltage source. The threshold value is a minimum value for the difference between the input voltage and the output voltage, above which the voltage converter is set to the first operating mode. The voltage converter can be operated with the first operating mode, for example, if the value of the input voltage is greater than the sum of the value of the output voltage and the threshold value.

In one embodiment, the on-state resistance of the second switch during the first phase has a value less than 1 Ohm. The value is preferably less than 100 mOhm. In one embodiment, the first and the second transistors are configured so that the second transistor achieves a lower on-state resistance than the on-state resistance of the first transistor. This is achieved with the values for the input voltage or the output voltage for which the voltage converter is specified. Because a large proportion of the losses in the first operating mode can be caused by the second switch, the effectiveness can be advantageously increased by a design of the second switch with a lower on-state resistance.

In one embodiment, the voltage converter comprises a voltage divider with a first and a second voltage divider resistor. The voltage divider couples the output of the voltage converter to the reference potential terminal. A voltage divider tap is arranged between the first and the second voltage divider resistors.

In a refinement, the voltage converter comprises an amplifier. A first input of the amplifier can be coupled via a reference potential source to the reference potential terminal. A second input of the amplifier can be connected to the tap of the voltage divider.

In one embodiment, the voltage converter comprises a pulse width modulator. The pulse width modulator can be configured to provide a pulse width modulated signal. The pulse width modulated signal adjusts the duration of the first phase of the first operating mode. The pulse width modulated signal can depend on a comparison of the output voltage, or the voltage derived from the output voltage, to a reference voltage. A set input of the pulse width modulator can be connected to an output of the amplifier.

In one embodiment, a method for voltage conversion comprises a supply of an input voltage at a first terminal of an inductor. In addition, a first switch is set to a blocking state in a first and second phase of a first operating mode. The first switch couples a second terminal of the inductor to a reference potential terminal. In addition, a second switch is put into a conductive operating state in the first phase and into an operating state with a different conductivity in the second phase. The second switch couples the second terminal of the inductor to one output of a voltage converter. An output voltage is emitted at the output of the voltage converter. The voltage converter comprises the inductor as well as the first and second switches.

The first switch is advantageously in a blocking state in both phases of the first operating mode, so that there is no current flow to the reference potential terminal. A first current flowing through the inductor can flow almost exclusively to the output of the voltage converter. The voltage converter advantageously has a high effectiveness of energy usage. Regulation is conducted exclusively by controlling the second switch. A risk such as simultaneously turning on the first and the second switches or a latch-up due to dynamic switching is reduced.

The invention will be described in detail below for several embodiment examples with reference to the figures. Components and circuit parts that are functionally identical or have the identical effect bear identical reference numbers. Insofar as circuit parts or components correspond to one another in function, a description of them will not be repeated in each of the following figures. Therein:

DETAILED DESCRIPTION OF THE DRAWINGS

Figure 1A:
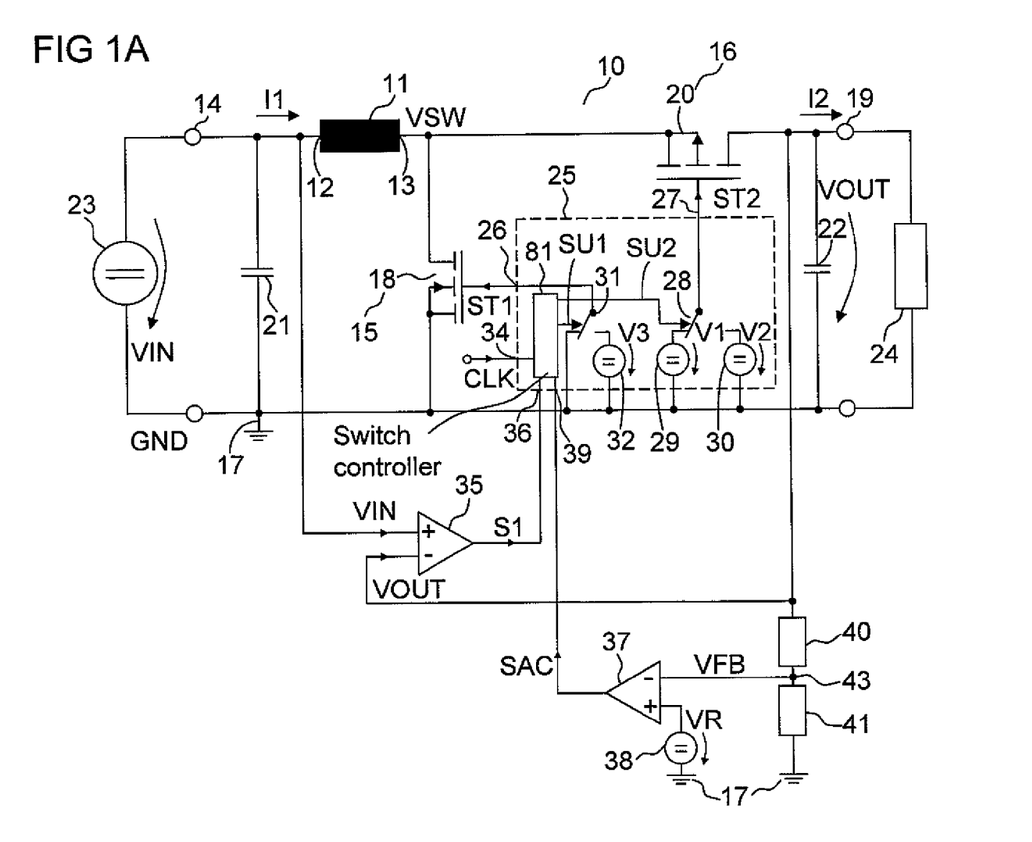
FIGS. 1A-1C show embodiment examples of a voltage converter according to the invention.

FIG. 1A shows an embodiment example of a voltage converter according to the invention. The voltage converter 10 comprises an inductor 11 with first and second terminals 12, 13. The first terminal 12 of the inductor 11 is connected to an input 14 of the voltage converter 10. The voltage converter 10 further comprises first and second switches 15, 16. The first switch 15 is arranged between the second terminal 13 of the inductor 11 and a reference potential terminal 17.

The first switch 15 has a first transistor 18. The second switch 16 is arranged between the second terminal 13 of the inductor 11 and an output 19 of the voltage converter 10. The second switch 16 has a second transistor 20. The first and the second transistors 18, 20 are each constructed as a field-effect transistor, FET for short. The first and second transistors 18, 20 are self-blocking, i.e. enhancement type. The first transistor 18 has a conductivity type opposite that of the second transistor 20. The first transistor 18 is realized as an n-channel FET. A substrate terminal of the first transistor 18 is connected to the reference potential terminal 17. The second transistor 20 is realized as a p-channel FET. A substrate terminal of the second transistor 20 is connected to the second terminal 13 of the inductor 11.

An input capacitor 21 couples the first terminal 12 of the inductor 11 to the reference potential terminal 17. In addition, an output capacitor 22 couples the output 19 of the voltage converter 10 to the reference potential terminal 17. A voltage source 23 is arranged between the input 14 of the voltage converter and the reference potential terminal 17. An electrical load 24 is arranged between the output 19 of the voltage converter 10 and the reference potential terminal 17. The electrical load 24 is symbolized by a resistor.

The voltage converter 10 further comprises a control unit 25. A first control output 26 of the control unit 25 is connected to a control terminal of the first switch 15. To accomplish this, the first control output 26 is connected to a control terminal of the transistor 18. A second control output 27 is correspondingly connected to a control terminal of the second switch 16. To accomplish this, the second control output 27 is connected to a control terminal of the second transistor 20. The control unit 25 has a first changeover switch 28. An output of the first changeover switch 28 is connected to the second control output 27 of the control unit 25. A first input of the changeover switch 28 is coupled via a first voltage source 29 to the reference potential terminal 17. A second input of the first changeover switch 28 is coupled via a second voltage source 30 to the reference potential terminal 17. The control unit 25 further comprises a second changeover switch 31. An output of the second changeover switch 31 is connected to the first control output 26 of the control unit 25. A first input of the second changeover switch 31 is connected to the reference potential terminal 17. A second input of the second changeover switch 31 is connected to a third voltage source 32.

The voltage converter 10 further comprises a first comparator 35 that is coupled at a first input to the first terminal 12 of the inductor 11. A second input of the first comparator 35 is coupled to the output 19 of the voltage converter 10. An output of the first comparator 35 is connected to a first control input 36 of the control unit 25. The voltage converter 10 comprises an additional comparator 37 that is coupled at a first input to the output 19 of the voltage converter 10. A second input of the additional comparator 37 is connected via a reference voltage source 38 to the reference potential terminal 17. An output of the additional comparator 37 is connected to an additional control input 39 of the control unit 25. The voltage converter 10 further comprises a voltage divider with first and second voltage divider resistors 40, 41. The voltage divider is arranged between the output 19 of the voltage converter 10 and the reference potential terminal 17. A voltage divider tap 43 between the first and second voltage divider resistors 40, 41 is connected to the first input of the additional comparator 37. The control unit 25 has a clock input 34.

The control unit 25 comprises a switch controller 81. The inputs of the switch controller 81 are connected to the clock input 34, via the first control input 36 to the output of the first comparator 35 and via the additional control input 39 to the output of the additional comparator 37. The outputs of the switch controller 81 are connected to the control inputs of the first and second changeover switches 28, 31. The switch controller 81 comprises logic gates such as OR-, NOR-, AND- as well as NAND-gates, flip-flops and inverters. The switch controller 81 may comprise at least a delay circuit or at least a buffer. The switch controller 81 can optionally be implemented as a state machine.

The voltage source 23 provides an input voltage VIN that drops between the input 14 of the voltage converter 10 and the reference potential terminal 17. The input voltage VIN is thus fed to the first terminal 12 of the inductor 11. The input voltage VIN is smoothed by means of the input capacitor 21. The input voltage VIN thus falls at a series circuit comprising the inductor 11 and the first switch 15. The output voltage VOUT is provided between the output 19 and the reference potential terminal 17. The output voltage VOUT is smoothed by the output capacitor 22. The output voltage VOUT falls at the electrical load 24.

The input voltage VIN is fed through to the first input, and the output voltage VOUT to the second input of the first comparator 35. A first signal S1, which is fed to the first control input 36 of the control unit 25, is provided at the output of the first comparator 35. The first signal S1 is formed as a function of a comparison of the input voltage VIN to the output voltage VOUT. An operating mode of the voltage converter 10 is selected according to the first signal S1. If a value of the input voltage VIN is higher than a value of the output voltage VOUT, then the voltage converter 10 is set to a first operating mode by means of the first signal S1. The voltage converter 10 is used as a step-down converter in the first operating mode. According to the first operating mode, the second changeover switch 31 connects the first input of the changeover switch 31 to the output of the second changeover switch 31. A reference potential GND is present at the reference potential terminal 17. Thus the reference potential GND is fed via the first control output 26 of the control unit 25 to the control input of the first switch 15. The first switch 15 is thus in an open, i.e. blocking operating state so that first switch 15 is not conductive. A controlled path of the first transistor 18 is thus switched to high impedance. The third voltage source 32 provides a third voltage V3.

In the first operating mode, the first changeover switch 28 periodically switches back and forth between the first and second inputs of the changeover switch 28. The first voltage source 29 provides a first voltage V1 and the second voltage source 30 provides a second voltage V2. Thus the first voltage V1 and the second voltage V2 are periodically fed to the control input of the second switch 16 via the second control output 27 of the control unit 25. Depending on the implementation of the second switch 16, the first and second voltages V1, V2 can take on different values, such as the value of the input voltage VIN, the value of the output voltage VOUT, a predetermined value for the output voltage VOUT, a value of a reference voltage, the reference potential GND or values between these voltages. The selection of the first and second voltages V1, V2 also depends on whether the input voltage VIN has a positive or negative value in comparison to the reference potential GND.

The voltage converter 10 operates with a clock signal CLK having a fixed frequency. The clock signal CLK is fed to the control unit 25 at the clock input 34. The clock signal CLK has a cycle time T, which can also be referred to as the period duration. During a first phase A, the first voltage V1 is fed to the control terminal of the second switch 16 during the cycle time T. During a second phase B on the other hand, the second voltage V2 is supplied to the control terminal of the second switch 16 during the cycle time T. The first voltage V1 has a lower value than the second voltage V2. Thus the second transistor 20 takes on a lower on-state resistance in the first phase A in comparison to the second phase B. A first current I1 flows through the inductor 11. The first current I1 flows from the voltage source 23 via the input 14 through the inductor 11 and the second switch 16 to the output 19 of the voltage converter 10. The first current I1 charges the output capacitor 22. In the first phase A, the second switch 16 is switched to high impedance, so that the first current I1 can increase. In the second phase B, the second switch 16 is set to a different conductivity by means of the voltage V2. The conductivity of the second switch 16 is lower during the second phase B than during the first phase A. The second switch 16 continues to be in a conductive operating state, however. The first current I1 decreases during the second phase B. A second current I2 flows from the output 19 to the load 24.

In one embodiment, the output capacitor 22 is charged in the settled state in the first phase A, since the first current I1 can be higher than the second current I2 in the first phase A. The output capacitor 22 is discharged in the second phase B, because the first current I1 is smaller than the second current I2 in the second phase B. A first duration TA of the first phase A can increase if the second current I2 flowing to the electrical load 24 N increases. The first duration TA can likewise increase if a difference between the value of the input voltage VIN and the value of the output voltage VOUT becomes smaller. The first duration TA can accordingly decrease in case the second current I2 decreases and/or in case of an increasing difference between input voltage VIN and output voltage VOUT.

If the input voltage VIN has a lower value than the output voltage VOUT, the control unit 25 adjusts the voltage converter 10 to a second operating mode, in accordance with the first control signal S1. The voltage converter 10 is used as a step-up converter in the second operating mode. In accordance with a first phase C of the second operating mode, the control unit 25 switches the first switch 15 into a conductive state, and the second switch 16 into a blocking state. In a second phase D of the second operating mode, the control unit 25 switches the first switch 15 into a blocking state and the second switch 16 into a conductive state. Thus an increase of the first current I1 is created during the first phase C of the second operating mode, and increasing energy over time is stored in the inductor 11. This energy of the inductor is fed to the output 19 via the second switch 16 in the second phase D of the second operating mode. The energy is stored by means of the output capacitor 22.

The voltage divider 40, 41 generates a feedback voltage VFB, which can be tapped at the voltage divider tap 43, from the output voltage VOUT. The feedback voltage VFB is fed to the first input of the additional comparator 37. The reference voltage source 38 provides a reference voltage VR, which is fed to the second input of the additional comparator 37. The additional comparator 37 outputs an activity signal SAC at the output. The activity signal SAC is supplied to the additional control input 39 of the control unit 25. The activity signal SAC is formed as a function of a comparison of the feedback voltage VFB to the reference voltage VR. If the feedback voltage VFB is less than the reference voltage VR, the control unit 25 carries out a voltage conversion. On the other hand, if the feedback voltage VFB has a higher value than the reference voltage VR, the control unit 25 shifts the voltage converter 10 to an inactive operating mode also referred to as an energy-saving or power-safe mode. In the energy-saving mode, the first and second switches 15, 16 are opened, i.e., set to the blocking operating state.

The voltage converter 10 can advantageously convert the input voltage VIN into the output voltage VOUT in two different operating modes, the first and second operating modes, namely as a step-up converter and a step-down converter, respectively. Only two switches 15, 16 are required for this. In the step-down conversion, current does not flow to the reference potential terminal, but rather almost exclusively to the output 19 of the voltage converter 10. The voltage converter 11 can advantageously make the second current I2 available with a high value. The voltage converter 10 is advantageously configured to provide the output voltage VOUT with only slight fluctuations even in case of interference and fluctuations of the input voltage VIN. The voltage converter 10 also has the energy-saving mode, which further increases the efficiency.

The substrate terminal of the second transistor 20 is advantageously permanently connected to the terminal of the second transistor 20, which is connected to the second terminal 13 of the inductor 11. The cause of this is that a voltage VSW at the second terminal 13 of the inductor 11 is higher than the output voltage VOUT in each of the operating phases A, B. It is therefore not necessary in the first operating mode to switch the substrate terminal of the second switch 20 back and forth between different terminals. The control terminal of the first transistor 18 can be permanently connected to the reference potential terminal 17 in the first operating mode. This reduces the risk of latch-up events and energy losses.

In an alternative embodiment, not shown, the first transistor 18 is realized as a p-channel FET. In an alternative embodiment, not shown, the second transistor is realized as an n-channel FET. The first and second control signals ST1, ST2 have voltages matched to the conductivity types of the FETs. The first and second transistors and 16, 18 are self-conductive, i.e. depletion type.

In an alternative embodiment, not shown, a threshold-value voltage source is arranged between the first terminal 12 of the inductor 11 and the first input of the first comparator 35, or between the output 19 of the voltage converter 10 and the second input of the first comparator 35. Thus the changeover point between the first and the second operating mode is shifted. Without a threshold-value voltage source, the changeover point is present when the values of the input and output voltage VIN and VOUT are equal.

In an alternative embodiment, not shown, a predetermined value voltage source couples the second input of the first comparator 35 to the reference potential terminal 17. The predetermined value voltage source provides a voltage with the predetermined value of the output voltage. The first signal S1 is thus formed as a function of a comparison of the input voltage VIN to the predetermined value of the output voltage.

Figure 1B:
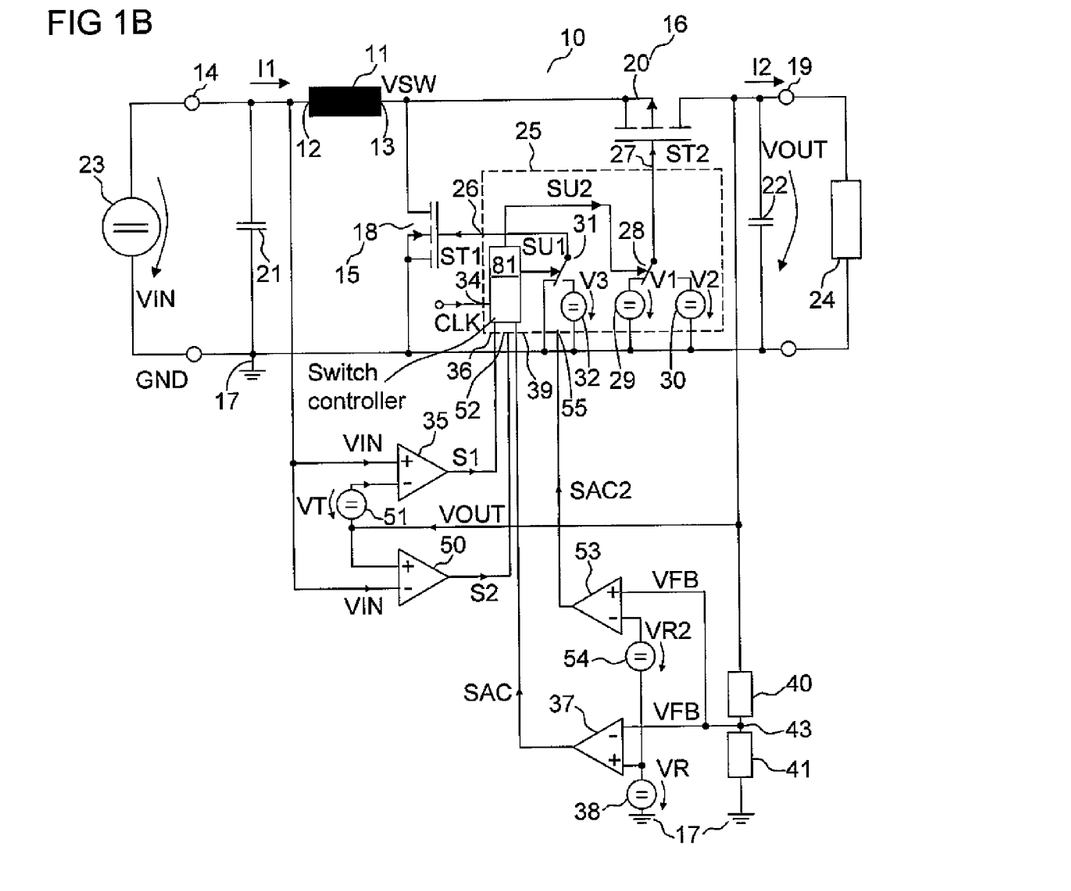

FIG. 1B shows an additional embodiment example of a voltage converter according to the invention. The embodiment shown in FIG. 1B represents a refinement of the voltage converter shown in FIG. 1A. The voltage converter 10 additionally comprises a second comparator 50. The second comparator 50 is connected at a first input to the output 19 of the voltage converter 10. A second input of the second comparator 50 is connected to the first terminal 12 of the inductor 11.

An output of the second comparator 50 is connected to a second control input 52 of the control unit 25. The voltage converter 10 further comprises a threshold-value voltage source 51. The threshold-value voltage source 51 is arranged between the second input of the first comparator 35 and the output 19 of the voltage converter 10.

The voltage converter 10 further comprises an additional comparator 53. A first input of the additional comparator 53 is coupled to the output 19 of the voltage converter 10. For this purpose, the first input of the additional comparator 53 is connected to the voltage divider tap 43. A second input of the additional comparator 53 is connected via an additional voltage source 54 and the reference voltage source 38 to the reference potential terminal 17. An output of the additional comparator 53 is connected to an additional control input 55 of the control unit 25.

The second comparator 50 provides a second signal S2 at the output. The second signal S2 is fed to the second control input 52 of the voltage converter 25. The second signal S2 is formed as a function of a comparison between the input voltage VIN and the output voltage VOUT. A threshold-value voltage VT drops across the threshold-value voltage source 51. Thus the first signal S1 according to FIG. 1B is formed as a function of a comparison of the input voltage VIN to the sum of the output voltage VOUT and the threshold-value voltage VT. If the output voltage VOUT has a higher value than the input voltage VIN, then the voltage converter 10 is set to the second operating mode by means of the second signal S2. The second operating mode is a step-up conversion. On the other hand, if the input voltage VIN is greater than the sum of the output voltage VOUT and the threshold-value voltage VT, the voltage converter 10 is set to the first operating mode by means of the first signal S1. The first operating mode is a step-down conversion. If the value of the input voltage VIN is greater than the value of the output voltage VOUT but less than the sum of the output voltage VOUT and the threshold-value voltage VT, however, the voltage converter 10 is set to a third operating mode. The third operating mode is a "feed through" mode. In the third operating mode, the control unit 25 switches the first switch 15 into a blocking state, and the second switch 16 into a conductive state. The operating states of the first and second switches 15, 16 in the third operating mode thus correspond to the operating states of the first and second switches 15, 16 in the first phase A of the first operating mode. In the third operating mode, the second switch 16 can be permanently conductive and the first switch can be 15 can block permanently. The input voltage VIN is passed through to the output 19 of the voltage converter 10 in the third operating mode.

The voltage converter 10 advantageously has a window comparator for selecting one of the three operating modes, namely the first, second or third operating mode. The window comparator is formed by the first and second comparators 35, 50. The first, the second or the third operating mode is an active operating mode. The effectiveness is increased with the third operating mode if the value of the input voltage VIN roughly corresponds to the value of the output voltage VOUT. The leakage currents are advantageously reduced. Fluctuations of the value of the output voltage VOUT are advantageously reduced. In one embodiment, the following ranges can be specified for the operating modes:

$VIN > VOUT + VT \rightarrow$ first operating mode, $VOUT + VT \geq VIN \geq VOUT \rightarrow$ third operating mode and $VOUT > VIN \rightarrow$ second operating mode, where VOUT is a value of the output voltage or alternatively the predetermined value for the output voltage, VIN is a value of the input voltage and VT is a value for the threshold voltage. The threshold value VT can be between 10 mV and 1000 mV. It can preferably be between 50 mV and 300 mV.

The feedback voltage VFB is fed to the first input of the additional comparator 53, and a sum of the value of the additional reference voltage VR2 and the value of the reference voltage VR is fed to the second input of the additional comparator 53. An additional activity signal SAC2, which is fed to the additional control input 55 of the control unit 25, can be tapped at the output of the additional comparator 53. If the value of the reference voltage VR is greater than the value of the feedback voltage VFB, then the voltage converter 10 is driven by means of the activity signal SAC in such a manner that the output voltage VOUT is increased in accordance with one of the operating modes. If the value of the feedback voltage VFB is greater than the value of the sum of the reference voltage VR and the additional reference voltage VR2, then the additional activity signal SAC2 is formed with a value such that the control unit 25 puts the voltage converter 10 into the inactive operating mode, the so-called energy-saving mode.

The voltage converter 11 comprises an additional window comparator for selecting the inactive operating mode or for putting it into an active operating mode. The active operating modes comprise the first, second and third operating modes, namely step-up, step-down and feed-through. The additional window comparator comprises additional comparators 37, 53. The adjustment to the inactive or one of the active operating modes takes place with a hysteresis. If the voltage converter 10 is being actively operated, it is only switched off if the output voltage VOUT exceeds a first threshold value VS. If the output voltage VOUT decreases in an inactive voltage converter 10 due to the consumption of electrical energy by the load 24, then the voltage converter 10 is placed in one of the active operating modes if the output voltage VOUT falls below a second threshold value VS2. The first threshold value VS has a higher value than the second threshold value VS2. The first and second threshold values VS depend on the predetermined value VGB of the output voltage VOUT and a differential voltage VDI. The first and second threshold values VS, VS2 can be calculated according to the following equations:

$$VS = VR \cdot \frac{R40 + R41}{R41} = VGB - VDI$$

and $$VS2 = (VR + VR2) \cdot \frac{R40 + R41}{R41} = VGB + VDI,$$

where R40 is a resistance value of the first voltage divider resistor 40, R41 is a resistance value of the second voltage divider resistor 41, VR is a value of the reference voltage and VR2 is a value of the additional reference voltage. The differential voltage VDI can have a value between 1 mV and 200 mV. It can preferably have a value between 5 mV and 100 mV.

Overall, the voltage converter 10 thus has four operating modes, namely an inactive operating mode, and the first, second and third operating modes for step-down conversion and step-up conversion as well as feeding through the input voltage VIN to the output 19 of the voltage converter 10. Therefore a high efficiency of energy usage is achieved. In the first operating mode, only one switch, namely the second switch 16, carries out switching processes. In the second operating mode, the first and second switches 15, 16 carry out switching processes. In the third operating mode and in the inactive operating mode, neither the first nor the second switch 15, 16 carries out switching processes.

The voltage source 23 can be realized as a battery. A long service life of the battery is advantageously achieved due to the high effectiveness of the voltage conversion. Since no switching processes take place in the inactive operating mode, a particularly high electromagnetic compatibility is attained during this time. Very high values of the second current I2 can advantageously be achieved. Due to the different operating modes, a very large range for the value of the input voltage VIN and a very large range for the value of the output voltage VOUT can advantageously be specified. The avoidance of simultaneous conductivity of the first and second switches 15, 16 reduces the risk of energy losses, for example by a current from the output capacitor 22 via the two switches 15, 16 to the reference potential 17.

Figure 1C:
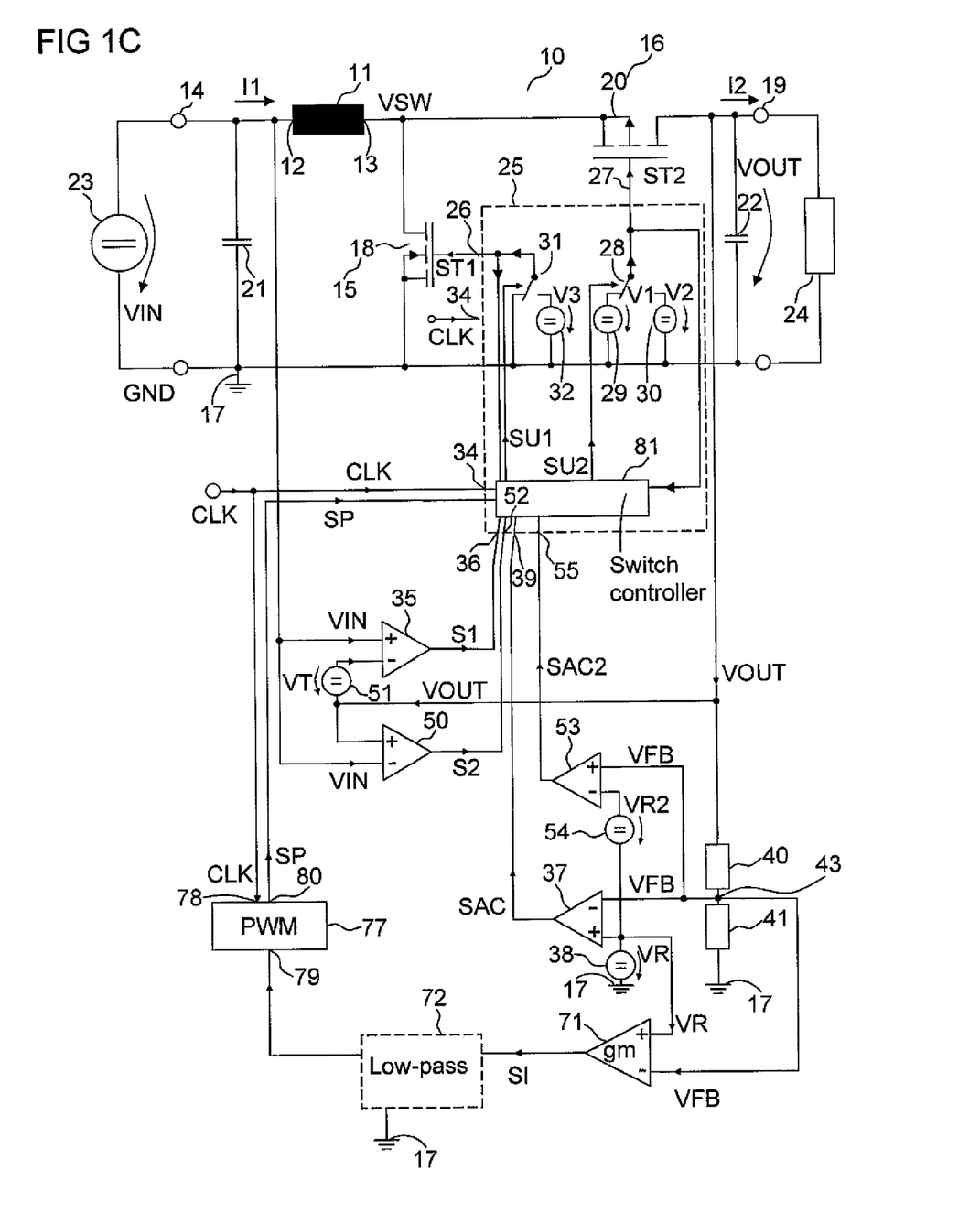

FIG. 1C shows an additional embodiment example of a voltage converter according to the invention. The embodiment shown in FIG. 1C is a refinement of the voltage converters shown in FIGS. 1A and 1B. According to FIG. 1C, the voltage converter 10 comprises an amplifier 71. The amplifier 71 is realized as an error amplifier. The amplifier 71 is constructed as a transconductance amplifier. A first input of the amplifier 71 is connected via the reference voltage source 38 to the reference potential terminal 17. A second input of the amplifier 71 is connected to the voltage divider tap 43. A filter 72 is connected to the output of the amplifier 71. The filter 72 is realized as a low-pass filter. The voltage converter 10 further comprises a pulse width modulator 77. The clock terminal 34 of the control unit 25 is connected to a clock input 78 of the pulse width modulator 77. The output of the amplifier 71 is connected to a set input 79 of the pulse width modulator 77. The filter 72 is arranged between the output of the amplifier 71 and the set input 79. The voltage converter 10 further comprises a switch controller 81. The switch controller 81 is connected on the input side to an output 80 of the pulse width modulator 77. The switch controller 81 further comprises inputs that are connected to the first, the second, and the additional control inputs 36, 39, 52, 55. On the output side, the switch controller 81 is connected to a control input of the first and second changeover switches 28, 31.

The amplifier 71 compares the reference voltage VR to the feedback voltage VFB and provides an analog signal SI at the output. The analog signal SI is a current signal. The analog signal SI is integrated by means of the filter 72 and converted into a voltage signal. The voltage signal is fed to the set input 79 of the pulse width modulator 77. The clock signal CLK is supplied to the clock input 78 of the pulse width modulator 77. The pulse width modulator 77 supplies a pulse width modulated signal SP at the output 80. The pulse width modulated signal SP is fed to the switch controller 81. The pulse width modulated signal SP thus depends on the difference between the feedback voltage VFB and the reference voltage VR. The duration of the first phase A of the first operating mode and the duration of the first phase C of the second operating mode are adjusted by means of the pulse width modulated signal SP. The first and second signals S1, S2, the activity signal SAC and the additional activity signal SAC2 are fed to the switch controller 81. The switch controller 81 outputs first and second changeover signals SU1, SU2 respectively to the first or the second changeover switch 28, 31. Thus the switch controller 81 can adjust the first and the second changeover switches 28, 31 in such a manner that the voltage converter 10 is switched into the first, second or third operating mode, or into the inactive operating mode.

FIG. 1C shows two additional connections to the switch controller 81. The first and the second control output 26, 27 are optionally connected to further inputs of the switch controller 81. Thus, the first and the second control signal ST1, ST2 are provided to the switch controller 81 for the realization of a break-before-make principle. Since the switch controller 81 receives the first and the second control signal ST1, ST2, the switch controller 81 has the information about the state of the first and the second switch 15, 16 and sets the first and the second changeover signal SU1, SU2 such that the first and the second switch 15, 16 are not in the conducting state at the same point in time. Before the first switch 15 is set in the conducting state, the second switch 16 is set in the blocking state. Moreover, before the second switch 16 is set in the conducting state, the first switch 15 is set in the blocking state. Consequently, an energy loss by a short circuit between the output 19 and the reference potential 17 via the two switches 15, 16 is avoided.

Figure 2A:
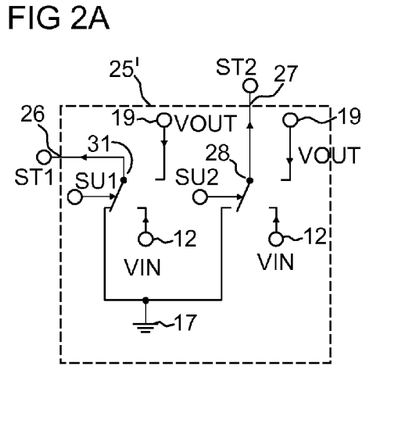
FIGS. 2A and 2B show embodiment examples of a control unit according to the invention.
Figure 2B:
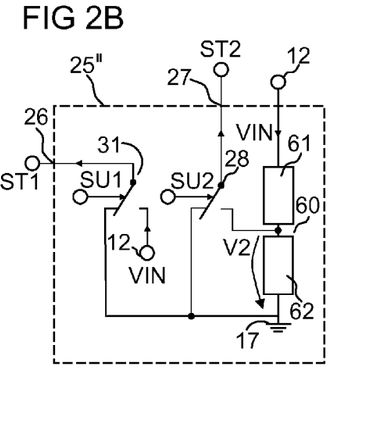

FIGS. 2A and 2B show additional embodiment examples of a control unit. The control units according to FIGS. 2A and 2B can be used in the voltage converter in place of the control unit shown in FIGS. 1A-1C. The control units according to FIGS. 2A and 2B constitute a refinement of the control unit 25 shown in FIGS. 1A-1C. In accordance with FIG. 2A, the first input of the first changeover switch 28 is connected to the reference potential terminal 17. The second input of the first changeover switch 28 is connected to the first terminal 12 of the inductor 11. A third input of the first changeover switch 28 is connected to the output 19 of the voltage converter 10. The second input of the second changeover switch 31 is connected to the first terminal 12 of the inductor 11. A third input of the first changeover switch 31 is coupled to the output 19 of the voltage converter 10.

According to FIG. 2A, the first voltage V1 has the value zero relative to the reference potential GND. The second voltage V2 additionally has the value of the input voltage VIN or, alternatively, the value of the output voltage VOUT. The third voltage V3 likewise has the value of the input voltage VIN or, alternatively, the value of the output voltage VOUT. Thus the reference potential GND is fed via the first changeover switch 28 to the control terminal of the second switch 16 in the first phase A of the first operating mode, as is the input voltage VIN or, alternatively, the output voltage VOUT in phase B of the first operating mode. The second transistor 20 is this highly conductive in the first phase A, compared to a higher on-state resistance in the second phase B compared to the first phase A. The ohmic losses in the second switch 16 are low due to the high conductivity of the second switch 16 in the first phase A.

According to FIG. 2B, the control unit 25" comprises an additional voltage divider 60. The additional voltage divider 60 comprises first and second voltage divider resistors 61, 62. The additional voltage divider 60 is arranged between the first terminal 12 of the inductor 11 and the reference potential terminal 17. A voltage divider tap between the first and second voltage divider resistors 61, 62 is connected to the second input of the first changeover switch 28. Thus the second voltage V2 can be generated by means of the additional voltage divider 60. The second voltage V2 has a value between the input voltage VIN and zero volts. The second transistor 20 can be switched on by means of the second voltage V2 in the second phase B of the first operating mode. The on-state resistance in the second phase B is higher than the on-state resistance in the first phase A of the first operating mode.

Figure 3A:
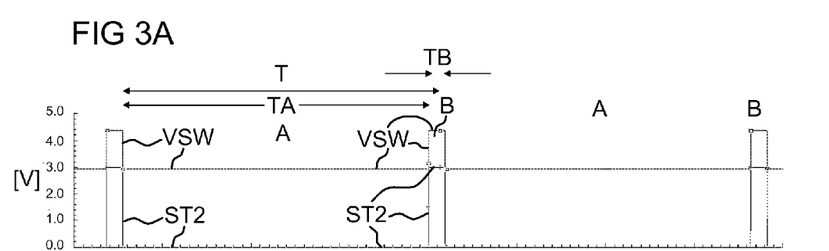
FIGS. 3A-3C, 4A and 4B are example signal curves of the voltage converter.
Figure 3B:
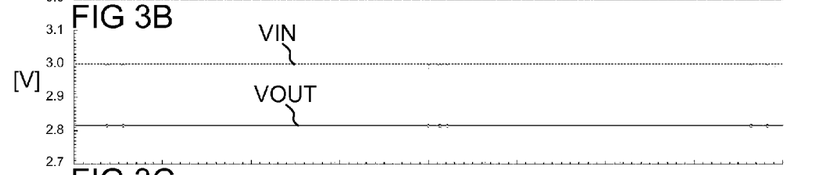
Figure 3C:
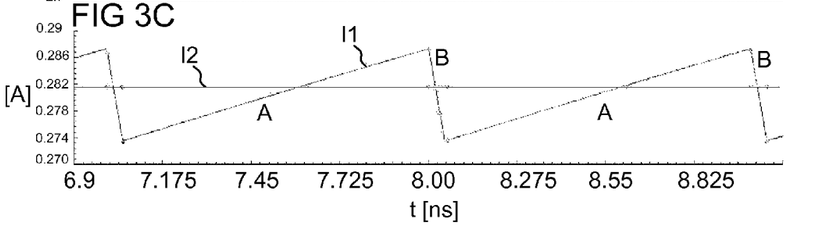

FIGS. 3A-3C show example signal curves of a voltage converter according to the invention in the first operating mode. The signals are presented as a function of a time t and were generated by means of simulation. FIG. 3A shows a voltage value of the second control signal ST2 and the voltage VSW, which can be tapped at the second terminal 13 of the inductor 11. FIG. 3B shows the input voltage VIN and the output voltage VOUT. The input voltage VIN has the value 3.0 V. According to the simulation, the output voltage VOUT can reach a value of roughly 2.8 V. The input voltage VIN is higher than the output voltage VOUT. FIG. 3A shows a duty cycle of 95%. For the simulation of FIG. 3A, the control terminal of the transistor 18 is permanently connected to the reference potential terminal 17. The control terminal of the second transistor 20 is connected to the reference potential terminal 17 in the first phase A and to the first terminal 12 of the inductor 11 during the second phase B. The second current I2 has a value of 280 mA. A smaller distance between the input voltage VIN and the output voltage VOUT can be achieved for smaller values of the second current I2. FIG. 3C shows the value of the first current I1, which flows through the inductor 11, and the second current I2, which flows to the load 24.

A cycle time T comprises the first duration TA of phase A and the second duration TB of phase B. The cycle time T and a duty cycle DR can be calculated according to the following equations:

$$T = TA + TB$$

and $$DR = \frac{TA}{T}$$

During the first phase A, the second control signal ST2 has the value zero volts, so that the second switch 16 is conductive and the first current I1 increases from a first value of roughly 274 mA to a second value of roughly 286 mA. The increase takes place due to the voltage difference between the input voltage VIN and the voltage VSW of roughly 0.2 V that drops across the inductor 11.

The second control signal ST2 has the value of the input voltage VIN, namely three volts, during the second phase B. In the second phase B, the second switch 16 continues to be switched on. Since the second switch 16 now has a higher on-state resistance, the first current I1 leads to a voltage drop across the second switch 16, which leads to an increase of the voltage VSW. According to FIG. 3A, the voltage VSW has a value of approximately 4.4 V in the second phase B. Since the voltage VSW is greater than the voltage at the first terminal 12 of the inductor 11, the first current I1 decreases. Since the energy content of the inductor 11 is proportional to the square of the first current I1 flowing through the inductor 11, the values of the first current do not have any discontinuities from the first phase A to the second phase B and from the second phase B to the first phase A. The first current I1 is thus constant at the transitions of the phases. Accordingly, the value of the output voltage VOUT can also vary only slightly even in the second phase B. This is the case for at least a very small value of the second current I2. Overall, a very slight fluctuation of the output voltage VOUT is achieved. Since the values of the first current I1, as shown in FIG. 3C, do not have any great fluctuations, the voltage converter 10 has a high electromagnetic compatibility, EMC for short.

In the first phase A, the second transistor 20 is completely conductive, and it is conductive in the second phase B with a high resistance. The energy loss can be estimated. The starting point for the calculation is an input voltage VIN of 4.1 V, an output voltage of 3.3 V and a second current I2 of 100 mA. A value of the energy loss PA in the second switch 16, of the power POUTA emitted on the output side and of the effectiveness EfA during the first phase A, and a value of the energy loss PB, of the power POUTB emitted on the output side and of the effectiveness EfB in the second phase B can be calculated according to the following equations:

$$PA = I1^2 \cdot RON1 = 100 \text{ mA} \cdot 100 \text{ mA} \cdot 100 \text{ mOhm} = 1 \text{ mW},$$

$$POUTA = VOUT \cdot I2 = 3.3 \text{ V} \cdot 100 \text{ mA} = 330 \text{ mW},$$

$$EfA = \frac{POUTA}{POUTA + PA} = \frac{330 \text{ mW}}{331 \text{ mW}} = 100\%,$$

$$PB = I2 \cdot DeltaV = 100 \text{ mA} \cdot 1.1 \text{ V} = 110 \text{ mW},$$

$$POUTB = VOUT \cdot I2 = 3.3 \text{ V} \cdot 100 \text{ mA} = 330 \text{ mW},$$

$$EfB = \frac{POUTB}{POUTB + PB} = \frac{300 \text{ mW}}{440 \text{ mW}} = 75\%$$

and $$Efoverall = D \cdot EfA + (1 - D) \cdot EfB = 90\%$$

in which RON1 is a value of the on-state resistance of the second switch 16 during the first phase A, I1 is a value of the first current, I2 is a value of the second current and DeltaV is a value of a voltage drop across the second switch 16 in the second phase B. This results in an overall effectiveness Efoverall of 90% at a duty cycle of 60%.

The first duration TA of the first phase A in the first operating mode and a first duration TC of the first phase of the second operating mode both increase in case of an increasing value of the second current I2 and a decreasing value of the input voltage VIN. While a value of the output voltage VOUT depends on the driving of the first and second switches 15, 16 in the second operating mode, it depends on the driving of the second switch 16 in the first operating mode, because the first switch 15 is permanently nonconductive therein.

In an alternative embodiment, not shown, the first switch 15 is briefly turned on in the first operating mode. A duration during which the first switch 15 is turned on is constant. The first duration TA can also be controlled in this embodiment.

Figure 4A:
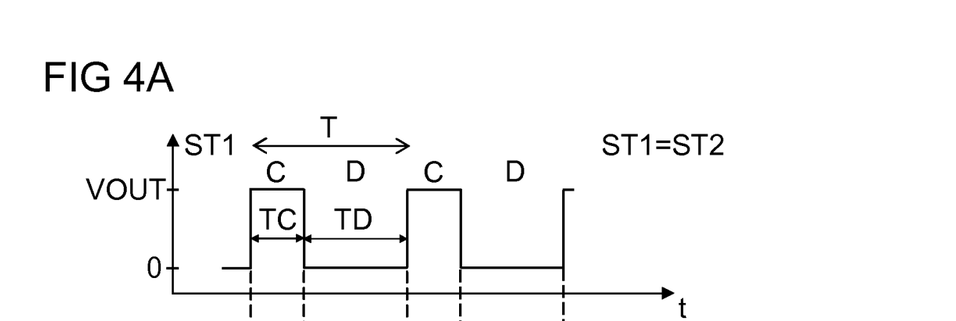
Figure 4B:
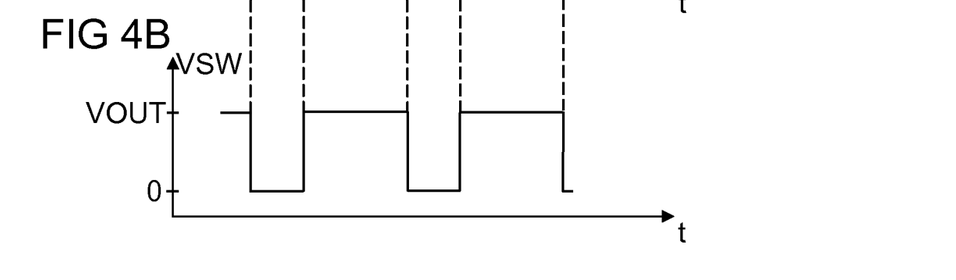

FIGS. 4A and 4B show an example of signal curves of the voltage converter according to the invention in the second operating mode. FIG. 4A shows the voltage value of the first control signal ST1. The voltage value of the first control signal ST1 is equal to the voltage value of the second control signal ST2. A period with the cycle time length T comprises a first phase C and a second phase D. The first control voltage ST1 has the value of the output voltage VOUT in the first phase C, and the value of the reference potential GND in the second phase D. Thus the first transistor 18 is conductive in the first phase C and blocking in the second phase D. Contrasting with that, the second transistor 20 is blocking in the first phase C and conductive in the second phase D.

FIG. 4B shows the voltage VSW at the second terminal 13 of the inductor 11. In the first phase C, the voltage VSW is at zero volts relative to the reference potential GND, because the first switch 15 is closed. In the second phase D, the voltage VSW is at approximately the value of the output voltage VOUT, because the second switch 16 is closed. Since the first and second transistors 18, 20 are of different conductivity types, one and the same signal can be fed to the first and second transistors 18, 20 in the second operating mode.

Due to the easy signal generation, a short circuit between the output 19 and the reference potential terminal 17 is advantageously avoided. During the first phase C, energy is stored in the inductor 11 that is output in the second phase D to the output capacitor 22 and the electrical load 24.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A voltage converter, comprising:
an inductor with a first terminal for supply of an input voltage;
a first switch comprising a first transistor arranged between a second terminal of the inductor and a reference potential terminal;
a second switch comprising a second transistor arranged between the second terminal of the inductor and an output of the voltage converter; and
a control unit that comprises a clock input to which a clock signal having a cycle time is provided, wherein the control unit is configured to switch the first switch into a blocking operating state in a first and a second phase of a first operating mode of the voltage converter, and to switch the second switch into a conductive operating state in the first phase and into an operating state with a different conductivity in the second phase, wherein the cycle time, also referred to as a period duration, is the sum of a first duration of the first phase of the first operating mode and a second duration of the second phase of the first operating mode, and is constant,
wherein the voltage converter is configured for step-down conversion in the first operating mode and for step-up conversion in a second operating mode,
wherein, during the first phase, a first voltage is fed to a control terminal of the second switch, and, during the second phase, a second voltage is fed to the control terminal of the second switch, wherein the first voltage has a lower value than the second voltage,
wherein the control unit comprises a voltage divider that is arranged between the first terminal of the inductor and the reference potential terminal, and
wherein the control unit comprises a first changeover switch having a first input coupled to the reference potential terminal, a second input connected to a voltage divider tap of the voltage divider and an output connected to the control terminal of the second switch.

2. The voltage converter according to claim 1, wherein the control unit is configured to adjust the second switch in such a manner that the second switch has a first value of an on-state resistance in the first phase of the first operating mode and a second value of the on-state resistance in the second phase of the first operating mode, and the second value is higher than the first.

3. The voltage converter according to claim 1, wherein the control unit is configured to adjust the second switch in such a manner that a first current through the second switch increases in the first phase of the first operating mode and decreases in the second phase of the first operating mode.

4. The voltage converter according to claim 1, comprising a first comparator having:
a first input, which is coupled to the first terminal of the inductor;
a second input, which is coupled to the output of the voltage converter or a predetermined value voltage source; and
an output that is connected to a first control input of the control unit.

5. The voltage converter according to claim 4, wherein a coupling between the first terminal of the inductor and the first input of the first comparator, or a coupling between the output of the voltage converter and the second input of the first comparator comprises a threshold-value voltage source.

6. The voltage converter according to claim 1, wherein the voltage converter is configured for permanent feed-through of the input voltage to the output of the voltage converter in a third operating mode.

7. The voltage converter according to claim 1, comprising:
a voltage divider with first and second voltage divider resistors, wherein the voltage divider is arranged between the output of the voltage converter and the reference potential terminal, and a voltage divider tap is arranged between the first and the second voltage divider resistor;
an amplifier with a first input, which is connected via a reference voltage source to the reference potential terminal, and with a second input, which is connected to the voltage divider tap and
a pulse width modulator with a set input, to which an output of the amplifier is connected, wherein the pulse width modulator is configured to provide a pulse width modulated signal, by means of which the duration of the first phase of the first operating mode is adjusted.

8. The voltage converter according to claim 1, wherein the voltage divider comprises first and second voltage divider resistors, and
wherein the second input is connected to the voltage divider tap between the first and the second voltage divider resistor of the voltage divider.

9. A method for voltage conversion, comprising:
supplying an input voltage to a first terminal of an inductor;
supplying a clock signal having a cycle time that is referred to as a period duration;
adjusting a first switch comprising a first transistor, which couples a second terminal of the inductor to a reference potential terminal, into a blocking operating state in a first and a second phase of a first operating mode;
adjusting a second switch comprising a second transistor, which couples the second terminal of the inductor to an output of a voltage converter, into a conductive operating state in the first phase and an operating state with a different conductivity in the second phase; and
emitting an output voltage at the output of the voltage converter, which comprises the inductor and the first and the second switch, wherein a cycle time is the sum of a first duration of the first phase of the first operating mode and a second duration of the second phase of the first operating mode, and is constant,
wherein the voltage converter performs a step-down conversion of the input voltage in the first operating mode and a step-up conversion of the input voltage in a second operating mode,
wherein, during the first phase, a first voltage is fed to a control terminal of the second switch, and, during the second phase, a second voltage is fed to the control terminal of the second switch, wherein the first voltage has a lower value than the second voltage,
wherein a voltage divider is arranged between the first terminal of the inductor and the reference potential terminal, and
wherein a first changeover switch comprises a first input coupled to the reference potential terminal, a second input connected to a voltage divider tap of the voltage divider and an output connected to the control terminal of the second switch.

10. The method according to claim 9, wherein the second switch has a first value of an on-state resistance in the first phase of the first operating mode and a second value of the on-state resistance in the second phase of the first operating mode, and the second value is higher than the first value.

11. The method according to claim 9, wherein the first and the second phase of the first operating mode repeat periodically with the cycle time.

12. The method according to claim 9, wherein the first duration is adjusted as a function of a difference between the input voltage and the output voltage, or of a difference between the input voltage and a predetermined value of the output voltage.

13. The method according to claim 9, wherein the voltage converter is adjusted to the first operating mode, if the input voltage is greater than:
   a sum of a value of the output voltage and a threshold value, or
   a sum of a predetermined value of the output voltage and the threshold value.

14. A voltage converter, comprising:
   an inductor with a first terminal for a supply of an input voltage;
   a first switch comprising a first transistor arranged between a second terminal of the inductor and a reference potential terminal;
   a second switch comprising a second transistor arranged between the second terminal of the inductor and an output of the voltage converter; and
   a control unit that comprises a clock input to which a clock signal having a cycle time is provided, wherein the control unit is configured to switch the first switch into a blocking operating state in a first and a second phase of a first operating mode of the voltage converter, and to switch the second switch into a conductive operating state in the first phase and into an operating state with a different conductivity in the second phase, wherein the cycle time, also referred to as a period duration, is the sum of a first duration of the first phase of the first operating mode and a second duration of the second phase of the first operating mode, and is constant, wherein the control unit comprises:
      an additional voltage divider, which comprises first and second voltage divider resistors and is arranged between the first terminal of the inductor and the reference potential terminal; and
      a first changeover switch having:
         a first input, which is coupled to the reference potential terminal;
         a second input, which is connected to a voltage divider tap between the first and the second voltage divider resistors of the additional voltage divider; and
         an output that is connected to a control terminal of the second switch,
   wherein the voltage converter is configured for step-down conversion in the first operating mode and for step-up conversion in a second operating mode,
   wherein, during the first phase, a first voltage is fed to the control terminal of the second switch, and, during the second phase, a second voltage is fed to the control terminal of the second switch, wherein the first voltage has a lower value than the second voltage, and
   wherein the first changeover switch is configured to periodically switch back and forth between the first and the second input of the changeover switch in the first operating mode.

15. A method for voltage conversion, comprising:
   supplying an input voltage to a first terminal of an inductor;
   supplying a clock signal having a cycle time that is referred to as a period duration;
   adjusting a first switch comprising a first transistor, which couples a second terminal of the inductor to a reference potential terminal, into a blocking operating state in a first and a second phase of a first operating mode;
   adjusting a second switch comprising a second transistor, which couples the second terminal of the inductor to an output of a voltage converter into a conductive operating state in the first phase and an operating state with a different conductivity in the second phase;
   emitting an output voltage at the output of the voltage converter, which comprises the inductor and the first and the second switch, wherein a cycle time is the sum of a first duration of the first phase of the first operating mode and a second duration of the second phase of the first operating mode, and is constant; and
   arranging an additional voltage divider, which comprises first and second voltage divider resistors, between the first terminal of the inductor and the reference potential terminal; and
   periodically switching a first changeover switch having a first input, which is coupled to the reference potential terminal, a second input, which is connected to a voltage divider tap between the first and the second voltage divider resistors of the additional voltage divider, and an output that is connected to a control terminal of the second switch, such that the first changeover switch is periodically switched back and forth between the first and the second input of the changeover switch in the first operating mode,
   wherein the voltage converter performs a step-down conversion of the input voltage in the first operating mode and a step-up conversion of the input voltage in a second operating mode, and
   wherein, during the first phase, a first voltage is fed to the control terminal of the second switch, and, during the second phase, a second voltage is fed to the control terminal of the second switch, wherein the first voltage has a lower value than the second voltage.

* * * * *